United States Patent
Kang et al.

(10) Patent No.: US 11,967,462 B2
(45) Date of Patent: Apr. 23, 2024

(54) CAPACITOR COMPONENT INCLUDING INDIUM AND TIN, AND METHOD OF MANUFACTURING THE CAPACITOR COMPONENT

(71) Applicant: SAMSUNG ELECTRO-MECHANICS CO., LTD., Suwon-si (KR)

(72) Inventors: Yun Sung Kang, Suwon-si (KR); Su Yeon Lee, Suwon-si (KR); Won Jun Na, Suwon-si (KR); Byung Kun Kim, Suwon-si (KR); Yu Hong Oh, Suwon-si (KR); Sun Hwa Kim, Suwon-si (KR); Jae Eun Heo, Suwon-si (KR); Hoe Chul Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 71 days.

(21) Appl. No.: 17/499,117

(22) Filed: Oct. 12, 2021

(65) Prior Publication Data

US 2023/0005664 A1 Jan. 5, 2023

(30) Foreign Application Priority Data

Jun. 30, 2021 (KR) .................. 10-2021-0085461

(51) Int. Cl.
*H01G 4/012* (2006.01)
*H01G 4/008* (2006.01)
*H01G 4/30* (2006.01)

(52) U.S. Cl.
CPC ........... *H01G 4/012* (2013.01); *H01G 4/0085* (2013.01); *H01G 4/30* (2013.01)

(58) Field of Classification Search
CPC ........ H01G 4/012; H01G 4/0085; H01G 4/30; H01G 4/1209; H01G 13/00
See application file for complete search history.

(56) References Cited

U.S. PATENT DOCUMENTS

| 2011/0165461 A1* | 7/2011 | Park ...................... H01G 11/42 977/773 |
| 2013/0082575 A1 | 4/2013 | Kang et al. |

(Continued)

FOREIGN PATENT DOCUMENTS

| KR | 10-2011-0047481 A | 5/2011 |
| KR | 10-2013-0036596 A | 4/2013 |
| KR | 10-2019-0113439 A | 10/2019 |

*Primary Examiner* — David M Sinclair
*Assistant Examiner* — Daniel M Dubuisson
(74) *Attorney, Agent, or Firm* — Morgan, Lewis & Bockius LLP (57) ABSTRACT

A capacitor component includes a body, including a dielectric layer and an internal electrode layer, and an external electrode disposed on the body and connected to the internal electrode layer. At least one hole is formed in the internal electrode layer, and a region, containing at least one selected from the group consisting of indium (In) and tin (Sn), is disposed in the hole. A method of manufacturing a capacitor component includes forming a dielectric green sheet, forming a conductive thin film, including a first conductive material and a second conductive material, on the dielectric green sheet, and sintering the conductive thin film to form an internal electrode layer. The internal electrode layer includes the first conductive material, and a region, including the second conductive material, is formed in the internal electrode layer.

32 Claims, 7 Drawing Sheets

(56) References Cited

U.S. PATENT DOCUMENTS

| | | | |
|---|---|---|---|
| 2016/0093443 A1* | 3/2016 | Hirao | H01G 4/232 |
| | | | 427/79 |
| 2019/0304695 A1 | 10/2019 | Kim et al. | |
| 2019/0304696 A1* | 10/2019 | Kim | H01G 4/12 |
| 2021/0202171 A1* | 7/2021 | Tsutsui | H01G 4/012 |
| 2022/0165502 A1* | 5/2022 | Iguchi | H01G 4/005 |
| 2022/0301771 A1* | 9/2022 | Suemasa | H01G 4/012 |
| 2022/0301773 A1* | 9/2022 | Hamada | H01G 4/008 |
| 2023/0162916 A1* | 5/2023 | Hirai | H01G 4/012 |
| | | | 361/301.4 |

* cited by examiner

CAPACITOR COMPONENT INCLUDING INDIUM AND TIN, AND METHOD OF MANUFACTURING THE CAPACITOR COMPONENT

CROSS-REFERENCE TO RELATED APPLICATION(S)

The present application claims the benefit of priority to Korean Patent Application No. 10-2021-0085461, filed on Jun. 30, 2021 in the Korean Intellectual Property Office, the entire disclosure of which is incorporated herein by reference.

TECHNICAL FIELD

The present disclosure relates to a capacitor component and a method of manufacturing the same.

BACKGROUND

A multilayer ceramic capacitor (MLCC), a type of capacitor component, is an important chip component used in industrial areas relating to communications, computing, home appliances, automobiles, and the like, due to advantages thereof such as compactness, guaranteed high capacitance, and desirable mountability characteristics. In particular, an MLCC is a core passive component used in various electric, electronic, and information communications devices such as mobile phones, computers, digital televisions (TVs), and the like.

In general, an MLCC is manufactured by screen-printing a conductive paste for forming an internal electrode layer on a dielectric green sheet, laminating a plurality of dielectric green sheets on which the conductive paste is printed, and sintering the plurality of dielectric green sheets. In general, the conductive paste is prepared by mixing conductive powder particles such as nickel (Ni), ceramic powder particles, a binder, a solvent, and the like, with each other. The conductive powder particles, used in the conductive paste, may be agglomerated or over-sintered during a sintering process, resulting in a decrease in connectivity of the internal electrode layer and a non-uniform thickness thereof.

SUMMARY

An aspect of the present disclosure is to provide a capacitor component for improving connectivity of an internal electrode layer.

Another aspect of the present disclosure is to provide a capacitor component for improving uniformity of an internal electrode layer.

Another aspect of the present disclosure is to provide a capacitor component for reducing a thickness of an internal electrode layer.

According to an aspect of the present disclosure, a capacitor component includes a body, including a dielectric layer and an internal electrode layer, and an external electrode disposed on the body and connected to the internal electrode layer. At least one hole is formed in the internal electrode layer. A region, containing at least one selected from the group consisting of indium (In) and tin (Sn), is present in the hole.

According to an aspect of the present disclosure, a capacitor component includes a body, including a dielectric layer and an internal electrode layer, and an external electrode disposed on the body and connected to the internal electrode. A plurality of holes are formed in the internal electrode layer, and each of the plurality of holes penetrates through the internal electrode layer. A region, including a conductive material different from that of the internal electrode layer, is present in at least some of the plurality of holes.

According to an aspect of the present disclosure, a method of manufacturing a capacitor component includes forming a dielectric green sheet, forming a conductive thin film, including a first conductive material and a second conductive material, on the dielectric green sheet by vapor deposition, and sintering the conductive thin film to form an internal electrode layer. The internal electrode layer includes the first conductive material. A region, including the second conductive material, is formed in the internal electrode layer.

According to an aspect of the present disclosure, a capacitor component includes, a capacitor component includes a body including a dielectric layer and an internal electrode layer. The internal electrode layer may include a plurality of holes spaced apart from each other, and a region including indium-tin oxide (ITO) is disposed in at least one of the plurality of holes.

According to an aspect of the present disclosure, a capacitor component includes, a capacitor component includes a body including a dielectric layer and an internal electrode layer. The internal electrode layer may include a plurality of holes spaced apart from each other. A region including at least one selected from the group consisting of indium (In) and tin (Sn) is disposed in at least one of the plurality of holes, and a ratio of a volume of the region to a volume of the internal electrode layer is 1 or more to 30 or less.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a direction of gravity.

Terms such as "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, a first direction may be defined as a T direction or a thickness direction, a second direction may be defined as an L direction or a length direction, and a third direction may be defined as a W direction or a width direction.

Hereinafter, a capacitor component and a method of manufacturing the same according to an exemplary embodiment of the present disclosure will be described in detail with reference to the accompanying drawings. Referring to the accompanying drawings, the same or corresponding components may be denoted by the same reference numerals, and overlapped descriptions will be omitted.

Capacitor Component

Figure 1:
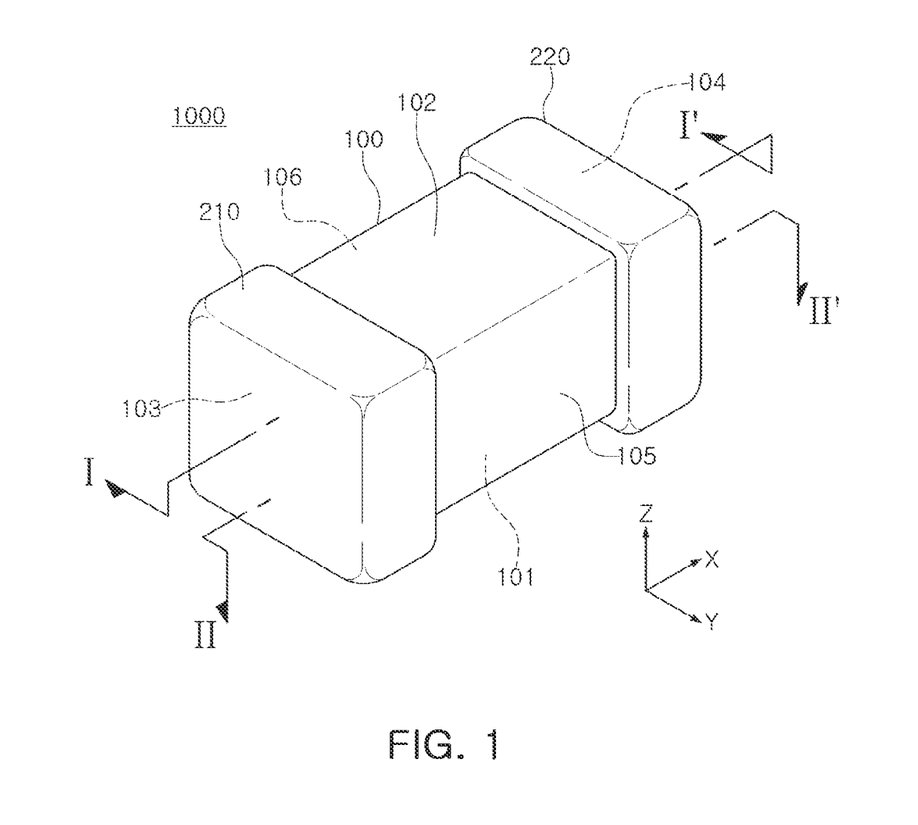
FIG. 1 is a schematic perspective view of a capacitor component according to an exemplary embodiment of the present disclosure.
Figure 2:
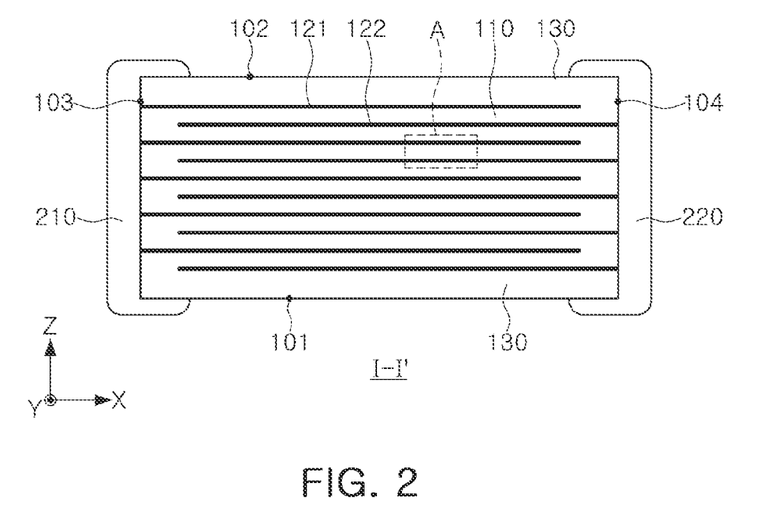
FIG. 2 is a schematic cross-sectional view taken along line I-I' of FIG. 1.
Figure 3:
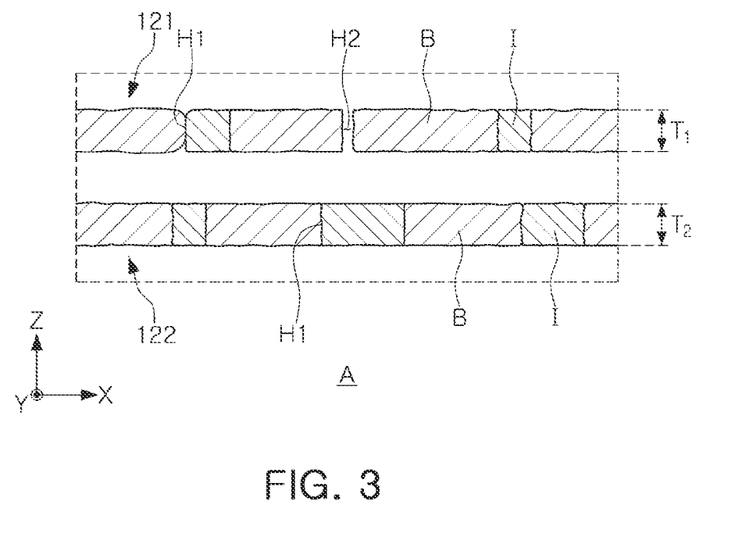
FIG. 3 is an enlarged view of portion "A" of FIG. 2.
Figure 4:
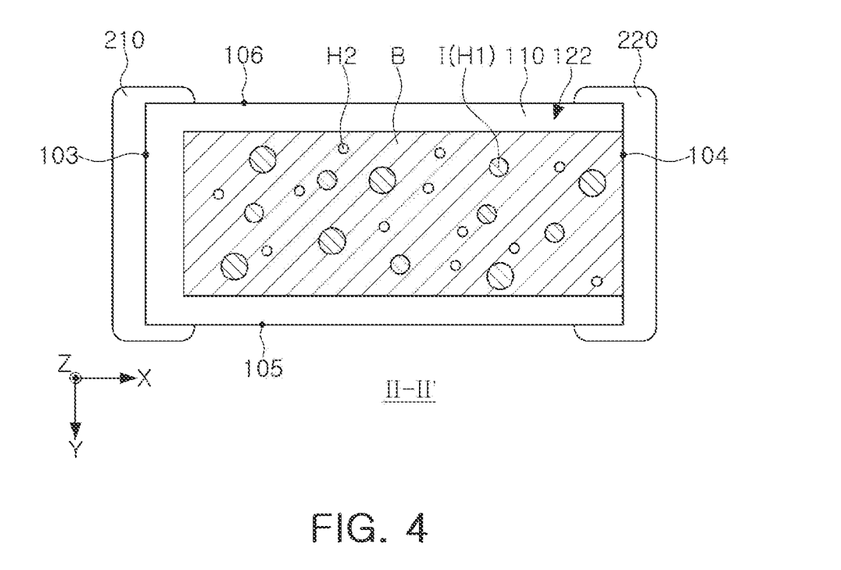
FIG. 4 is a schematic cross-sectional view, taken along line II-II' of FIG. 2, illustrating a portion of an internal electrode layer.
Figure 5:
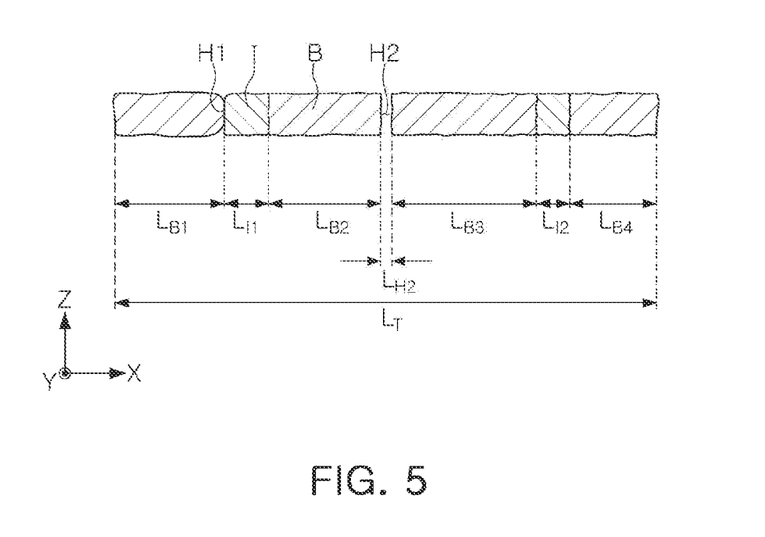
FIG. 5 is a schematic view of an internal electrode layer.

FIG. 1 is a schematic perspective view of a capacitor component according to an exemplary embodiment of the present disclosure. FIG. 2 is a schematic cross-sectional view taken along line I-I' of FIG. 1. FIG. 3 is an enlarged view of portion "A" of FIG. 2. FIG. 4 is a schematic cross-sectional view, taken along line II-II' of FIG. 2, illustrating a portion of an internal electrode layer. FIG. 5 is a schematic view of an internal electrode layer.

Referring to FIGS. 1 to 5, the capacitor component 1000 according to an exemplary embodiment may include a body 100 and external electrodes 210 and 220.

The body 100 may form an exterior of the capacitor component 1000 according to the present embodiment. A shape of the body 100 is not limited to any particular shape, but as illustrated in the drawings, the body 100 may have a hexahedral shape or a shape similar thereto. Due to shrinkage of ceramic powder particles contained in the body 100 during a sintering process, the body 100 may not have a hexahedral shape having completely straight lines but may have a substantially hexahedral shape.

The body 100 may have a first surface 101 and a second surface 102 opposing each other in a thickness direction Z, a third surface 103 and a fourth surface 104 opposing each other in a length direction X, and a fifth surface 105 and a sixth surface 106 opposing each other in a width direction Y, based on FIGS. 1, 2, and 4. Each of the third to sixth surfaces 103, 104, 105, and 106 of the body 100 may correspond to a wall surface of the body 100 connecting the first surface 101 and the second surface 102 of the body 100 to each other. Hereinafter, both end surfaces (one end surface and the other end surface) of the body 100 may refer to the third surface 103 and the fourth surface 104 of the body 110, respectively, and both side surfaces (one side surface and the other side surface) of the body 100 may refer to the fifth surface 105 and the sixth surface 106 of the body 100, respectively. In addition, one surface and the other surface of the body 100 may refer to the first surface 101 and the second surface 102 of the body 100, respectively. One surface of the body 100 may be used as a mounting surface when the capacitor component 1000 according to the present embodiment is mounted on a mounting board such as a printed circuit board (PCB).

The body 100 may include a dielectric layer 110 and first and second internal electrode layers 121 and 122 alternately disposed with the dielectric layer 110 interposed therebetween. Each of the dielectric layer 110, the first internal electrode layer 121, and the second internal electrode layer 122 may include a plurality of layers. Hereinafter, the first and second internal electrode layers 121 and 122 will be collectively referred to internal electrode layers 121 and 122, except for the case in which they are required to be distinguished from each other. Accordingly, the description of portions collectively referred to as the internal electrode layers 121 and 122 may be commonly applied to the first and second internal electrode layers 121 and 122.

A plurality of dielectric layers 110 forming the body 100 are in a sintered state and may be integrated, such that boundaries therebetween may not be readily apparent without using a scanning electron microscope (SEM).

A plurality of dielectric layers 110, constituting the body 100, are in a sintered state and may be integrated, such that boundaries therebetween may not be readily apparent without using a scanning electron microscope (SEM).

A material forming the dielectric layers 110 is not limited as long as sufficient capacitance may be obtained therewith and may be, for example, barium titanate ($BaTiO_3$) powder. The material forming the dielectric layers 110 may include various additives, organic solvents, plasticizers, binders, dispersants, and the like, added to the $BaTiO_3$ powder, or the like, according to the purpose of the present disclosure.

A cover layer 130 may be disposed on upper and lower portions of the body 100, for example, both end portions of the body 100 in the thickness direction (the Z direction). The cover layer 130 may serve to maintain reliability of the capacitor component against external impacts. The cover layer 110 may be formed using a material for forming the dielectric layer 110, or a material different from the material for forming the dielectric layer 110. For example, in the latter case, the material for forming the dielectric layer 110 and the material for forming the cover layer 130 are different in terms of at least one of a composition, a size, a content, and dispersion degree of ceramic particles in the material, or at least one of a composition, a size, a content, and dispersion degree of sub-components in the material.

The internal electrode layers 121 and 122 may be disposed alternately with the dielectric layer 110, and may include first and second internal electrode layers 121 and 122. The first and second internal electrode layers 121 and 122 may be alternately disposed to face each other with the respective dielectric layer 110 interposed therebetween, and may be exposed to the third and fourth surfaces 103 and 104 of the body 100, respectively.

The internal electrode layers 121 and 122 may be alternately exposed to the third surface 103 and the fourth surface 104, both end surfaces of the body in the length direction X, to be connected to the first and second external electrodes 210 and 220, respectively. For example, the first internal electrode layer 121 may be exposed to the third surface 103 of the body 100 so as to be connected to the first external electrode 210, and may not be exposed to the fourth surface 104 of the body 100 so as not to be connected to the second external electrode 220. The second internal electrode layer 122 may be exposed to the fourth surface 104 of the body 100 so as to be connected to the second external electrode 220, and may not be exposed to the third surface 103 of the body 100 so as not to be connected to the external electrode 210. Accordingly, the first internal electrode layer 121 may be spaced apart from the fourth surface 104 of the body 100 by a predetermined distance, and the second internal electrode layer 122 may be spaced apart from the third surface 103 of the body 100 by a predetermined distance. In this case, the internal electrode layers 121 and 122 may be electrically insulated from each other by the dielectric layer 110 disposed therebetween.

The internal electrode layers 121 and 122 may have a base portion "B," a connection portion "I," and a hole "H2" penetrating through the base portion "B." Furthermore, as will be described later, when the connection portion "I" is in a form penetrating through the base portion "B," the internal electrode layers 121 and 122 may further have a hole H1 in which the connection portion "I" is disposed.

The base portion B may form an overall exterior of the internal electrode layers 121 and 122 and may have a shape, similar to a plate shape, overall. In FIGS. 3 and 5, the base portion "B" is illustrated as including a plurality of base portions spaced apart from each other, but this is because FIGS. 3 and 5 illustrate a portion of a cross-section of the body 100. As illustrated in FIG. 4, the base portion "B" is an integrated member in which only a plurality of holes H1 and H2 spaced apart from each other are formed, based on a plan view.

The base portion "B" may include, for example, at least one of palladium (Pd), silver (Ag), nickel (Ni), and copper (Cu). As an example, the base portion "B" is formed by forming a precious metal material such as palladium (Pd), a palladium-silver (Pd—Ag) alloy, or the like, and at least one of nickel (Ni) and copper (Cu) by vapor deposition such as sputtering, chemical vapor deposition (CVD), or atomic layer deposition (ALD), and then sintering the same. As another example, the base portion "B" may be formed by applying a conductive paste, containing conductive powder particles including a precious metal material such as palladium (Pd), a palladium-silver (Pd—Ag) alloy, or the like, and at least one nickel (Ni) and copper (Cu), on a dielectric green sheet, and then sintering the same.

The connection portion "I" is partial regions of the internal electrode layers 121 and 122, which may be disposed in the base portion "B" while being spaced apart from each other. The connection portion "I" may include a conductive material different from that of the base portion "B." The connection portion "I" may contain one or more elements selected from the group consisting of indium (In) and tin (Sn). The connection portion "I" may be, for example, indium oxide ($In_2O_3$) containing indium (In), a tin oxide ($SnO_2$) containing tin (Sn), or indium tin oxide (ITO) containing both indium (In) and tin (Sn). As an example, the connection portion "I" may be formed by simultaneously or sequentially forming a conductive material for forming the base portion "B" and a conductive material (for example, ITO) for forming the connection portion "I" on a dielectric green sheet using vapor deposition such as sputtering, chemical vapor deposition (CVD), or atomic layer deposition (ALD), and then sintering the same.

The connection portion "I" may be provided as a plurality of connection portions "I" disposed in the base portion (B) while being spaced apart from each other. In this regard, each of the plurality of connection portions "I" may be considered to be disposed in the base portion "B" in the form of an island. Alternatively, each of the plurality of connection portions "I" may be regarded as being a partial region of the internal electrode layers 121 and 122 present in the form of an island in the internal electrode layers 121 and 122. The connection portion "I" may be disposed in at least a portion of the plurality of holes H1 and H2, formed in the internal electrode layers 121 and 122, to fill at least portion of a region in which the internal electrodes 121 and 122 are disconnected (the plurality of holes H1 and H2), resulting in improved connectivity of the internal electrodes 121 and 122. That is, as illustrated in FIG. 3, the connection portion "I" may be disposed in the hole H1 to connect at least a portion of the region in which the internal electrode layers 121 and 122 are disconnected.

When the connection portion "I" includes indium-tin oxide (ITO), a molar ratio of indium (In) to tin (Sn) in the connection portion "I" may be 1 or more to 19 or less. For example, the indium-tin oxide (ITO) used to form the connection portion "I" may include 50 to 95 mol % of indium (In)—5 to 50 mol % of tin (Sn). When the molar ratio of indium (In) to tin (Sn) in the connection portion "I" is less than 1, conductive characteristics of the connection portion "I" may be deteriorated, resulting in poor component characteristics. When the molar ratio of indium (In) to tin (Sn) in the connection portion "I" is greater than 19, the manufacturing costs of the component may be increased. Meanwhile, the above-described molar ratio between tin (Sn) and indium (In) may be measured through TEM-EDS, but the scope of the present disclosure is not limited thereto.

Conventionally, the internal electrode layer may be formed by printing a conductive paste for forming an internal electrode layer on a dielectric green sheet, laminating and cutting a plurality of pieces of the green sheet to manufacture a green chip, and sintering the green chip. The conductive paste may be prepared by mixing metal powder particles such as nickel (Ni), ceramic powder particles, a binder, a solvent, and the like. In the nanosized nickel (Ni) powder particles used in the conductive paste, necking between the metal powders particles may occur around 400° C. to 450° C. and a sintering process may be excessively performed at a sintering temperature of 1000° C. or higher. As a result, after sintering, agglomeration and disconnection may occur in the internal electrode layer. Such disconnection and agglomeration of the internal electrode layer may deteriorate the thickness uniformity of the internal electrode layer. In addition, the disconnection of the internal electrode layer may decrease capacitance of the capacitor component, and the agglomeration of the internal electrode layer may cause an increase in the thickness of the internal electrode layer and a decrease in the thickness of the dielectric layer.

In the capacitor component 1000 according to the present embodiment, to address the above-described issues, the internal electrode layers 121 and 122 may be configured to include a base portion "B" and connection portions "I" disposed to be spaced apart from each other and including a conductive material different from that of the base portion "B". For example, the connection portions "I" are disposed in the base portion "B" to be spaced apart from each other and includes a conductive material different from that of the base portion "B," so that diffusion of the conductive material constituting the base portion "B" during a sintering process may be reduced to prevent the above-described issues of the related art (disconnection and agglomeration of the internal electrode layer). The above-described structure of the internal electrode layers 121 and 122 may be implemented by simultaneously or sequentially vapor-depositing a material for forming the connection portion "I" and a material for forming the base portion "B", and then sintering the same. During the sintering, mutual diffusion of the material for forming the connection portion "I" and the material for forming the base portion "B" may be suppressed because they are different from each other. As a result, the internal electrodes 121 and 122 including the above-described connection portion "I" may be implemented. Alternatively, the above-described structure of the internal electrode layers 121 and 122 may be implemented by applying the conductive paste for forming the connection portion I and the conductive paste for forming the base portion B to a dielectric green sheet for each region, and then sintering the same.

In the capacitor component 1000 according to the present embodiment, when the base portion "B" includes nickel (Ni) and the connection portion "I" includes indium-tin oxide (ITO), the above-described issues of the related art (disconnection and agglomeration of the internal electrode layer) may be more effectively prevented. Specifically, due to relatively low solubility of indium-tin oxide (ITO) to nickel (Ni), the indium-tin oxide (ITO) may reduce diffusion of nickel (Ni), included in the base portion "B," to suppress agglomeration of nickel (Ni), resulting in improved thickness uniformity of the internal electrode layers 121 and 122. In addition, even when a disconnected region (for example, a hole) is formed in the base portion "B" by the agglomeration of nickel (Ni), indium-tin oxide (ITO) may be disposed in at least a portion of the region, in which the base portion "B" is disconnected, due to relatively low solubility between nickel (Ni) and the indium-tin oxide (ITO). As a result, each of the base portion B and the internal electrode layers 121 and 122, applied to the present embodiment, may have relatively high connectivity.

The capacitor component 1000 according to the present embodiment may be manufactured by a conductive thin film (121' (122') of FIGS. 7 to 13) on a dielectric green sheet (110' of FIGS. 6 to 13) by vapor deposition, and then sintering the same. As compared with the related art in which a conductive paste for forming an internal electrode is printed and sintered, a conductive thin film of the present disclosure is disposed to be dense, and thus, the internal electrodes 121 and 122 may be formed to be dense. As a result, the connectivity and thickness uniformity of the internal electrode layers 121 and 122 may be relatively improved, as compared with the related art. In addition, the capacitor component 1000 according to the present embodiment may be advantageous for thinning the internal electrode layers 121 and 122 due to the above-described vapor deposition.

The connection portion I may penetrate through the base portion "B," as illustrated in FIGS. 3 and 5, but may not penetrate through the base portion "B." In the former case, the connection portion "I" may be disposed in the hole H1 penetrating through the base portion "B." In the latter case, the connection portion "I" may be disposed in a groove formed in the base portion "B." In the following description, it will be assumed that the connection portion "I" penetrate through the base portion "B," for ease of description, but the scope of the present disclosure is not limited thereto. When the connection portion "I" is disposed to penetrate through the base portion "B," electrode agglomeration caused by diffusion during a process of sintering conductive particles forming the above-described base portion "B" may be more effectively prevented.

FIG. 5 conceptually illustrates one of the internal electrodes 121 and 122 illustrated in a cross-section of the body 100 in a thickness direction Z from a central portion of the body 100 in a width direction Y, for example, a cross-section of the body 100 in a length-thickness direction X-Z. Specifically, referring to FIG. 5, the internal electrode layers 121 and 122 may include a base portion "B," a connection portion "I," and a plurality of holes H1 and H2. The holes H1 and H2 may be regions of the internal electrode layers 121 and 122 in which the base portion "B" is not formed. The first hole H1 may be a hole in which the connection portion "I" is disposed, and the second hole H2 may be a hole in which a dielectric material forming the dielectric layer 110 is disposed, or may be a void. For example, a conductive material may not be disposed in the second hole H2.

Referring to FIG. 5, in the cross-section of the body 100 in the thickness direction Z, a ratio of the sum of lengths $L_{B1}$, $L_{B2}$, $L_{B3}$, $L_{B4}$, $L_{I1}$, and $L_{I2}$ of the base portion "B" and the connection portion "I" in the length direction X to a total length of the internal electrode layers 121 and 122 in the length direction X may be 0.8 or more. The ratio is related to the above-described connectivity of the internal electrode layers 121 and 122. When the ratio is less than 0.8, the connectivity of the internal electrode layers 121 and 122 may be deteriorated to decrease capacitance. In addition, in the cross-section of the body 100 in the thickness direction Z, a ratio of the length $L_{H2}$ of the second hole H2 in the length direction X to the total length $L_T$ of the internal electrode layers 121 and 122 may be 0.2 or less.

The total length $L_T$ of the internal electrode layers 121 and 122 may be measured using an optical image or an SEM image obtained by scanning an X-Z cross-section in which the capacitor component is taken in a central portion in the width direction Y. As an example, the total length $L_T$ of the internal electrode layers 121 and 122 may refer to a value obtained by selecting one of the internal electrodes 121 and 122 illustrated in the image, measuring a dimension of the selected internal electrode in the Z direction two or more times, and arithmetically averaging the measured dimensions. The measuring of the dimension two or more times may be performed at regular intervals, but exemplary embodiments are not limited thereto. In addition, the total length of the internal electrode layers 121 and 122 may refer to a value obtained by calculating a length of each of the internal electrodes 121 and 122, illustrated in the image, in the above-described method, and dividing the calculated length by the total number of electrode layers 121 and 122. The description of the method of measuring the total length $L_T$ of the internal electrode layers 121 and 122 in the length direction X may be equally applied to each of the length $L_{B1}$, $L_{B2}$, $L_{B3}$, and $L_{B4}$ of the base portion "B" in the length direction X, the lengths $L_{I1}$ and $L_{I2}$ of the connection portion "I" in the length direction X, and a length of a region, in which a conductive material is not formed, (the length $L_{H2}$ of the second hole H2) in the length direction X.

A volume ratio (vol %) of a volume of the connection portion "I" to a volume of the base portion "B" may be 1 or more to 30 or less. When the volume ratio (vol %) of the volume of the connection portion "I" to the volume of the base portion "B" is less than 1, a ratio of the connection portion "I" in the internal electrode layers 121 and 122 is low, and thus, the above-described effect, for example, the effect of improving the connectivity and thickness uniformity of the electrode layers 121 and 122 may be reduced. When the volume ratio (vol %) of the volume of connection portion "I" to the volume of the base portion "B" is greater than 30, an interface between the base portion "B" and the connection portion "I" may be increased more than necessary to deteriorate component characteristics.

The volume of each of the base portion "B" and the connection portion "I" may be defined using an optical image or a scanning electron microscope (SEM) image obtained by scanning an X-Y cross-section in which the capacitor component is taken to expose the internal electrode layers 121 and 122. For example, in the image, an area of each of the base portion "B" and the connection portion "I" may be obtained, and the obtained area may be defined as a volume of each of the base portion "B" and the connection portion "I." As described above, the connection portion "I" is provided as a plurality of connection portions "I", and thus, an area of the above-described connection portion "I" may refer to an area of each of the plurality of connection portions "I."

The base portion "B" may not include a dielectric material of the dielectric layer 110. For example, when a conductive thin film is formed by vapor deposition and then sintered to form the internal electrode layers 121 and 122, a conductive thin film may not include ceramic powder particles such as barium titanate ($BaTiO_3$) contained in a conventional conductive paste for forming an internal electrode layer. As a result, in the present embodiment, the base portion "B" may not include the dielectric material of the dielectric layer 110, unlike the related art. For example, when the dielectric layer 110 includes barium titanate ($BaTiO_3$) as a dielectric material, the base portion "B" may include each element (barium (Ba), titanium (Ti), or the like) constituting the dielectric material due to material diffusion during a sintering process, but may not include a dielectric material (for example, $BaTiO_3$) itself forming the dielectric layer 110. This is X-Ray Diffraction (XRD) or energy dispersive spectroscopy (EDS) mapping by which it can be confirmed that no dielectric material is present in the base portion "B."

The thickness of the internal electrode layers 121 and 122 may be 10 nm or more to 500 nm or less. When the thickness of the internal electrode layers 121 and 122 is less than 10 nm, the connectivity of the internal electrode layers 121 and 122 may be deteriorated to reduce capacitance. When the thickness of the internal electrode layers 121 and 122 is greater than 500 nm, it may be difficult to achieve electrical insulation between the internal electrode layers 121 and 122 because the dielectric layer 110 is formed to be thin based on a component having the same size.

The thicknesses T1 and T2 of the internal electrode layers 121 and 122 may be measured using an optical image or an SEM image obtained by scanning an X-Z cross-section in which the capacitor component is taken in a central portion in the width direction Y. As an example, the thickness of the internal electrode layers 121 and 122 may refer to a value obtained by selecting one of the internal electrodes 121 and 122 illustrated in the image, measuring a dimension of the selected internal electrode in the Z direction two or more times, and arithmetically averaging the measured dimensions. The measuring of the dimension two or more times may be performed at regular intervals, but exemplary embodiments are not limited thereto. In addition, the thickness of the internal electrode layers 121 and 122 may refer to a value obtained by calculating a thickness of each of the internal electrodes 121 and 122, illustrated in the imaged, in the above-described method, and dividing the calculated thickness by the total number of electrode layers 121 and 122.

A ratio of a difference between thicknesses of adjacent internal electrode layers 121 and 122 to a thickness of one of the adjacent internal electrode layers 121 and 122 may be 5% or less. Referring to FIG. 3, one of the first internal electrode layers 121 and one of the second internal electrode layers 122 may be adjacent to each other. A ratio of a difference between thicknesses T1 and T2 of the first and second internal electrode layers 121 and 122 to the thickness T1 of the first internal electrode layer 121 may be 5% or less. For example, thicknesses of the plurality of internal electrode layers 121 and 122 may be relatively uniform. The thicknesses T1 and T2 of the first and second internal electrode layers 121 and 122 may be calculated by the above-described method.

A ratio of a difference between an average thickness of the internal electrode layers 121 and 122 and a maximum thickness of the internal electrode layers 121 and 122 to the average thickness of the internal electrode layers 121 and 122 may be 5% or less. The average thickness of the internal electrode layers 121 and 122 and the maximum thickness of the internal electrode layer may be calculated by selecting one of the plurality of internal electrode layers 121 and 122, as described above, or may be calculated for all of the plurality of internal electrode layers 121 and 122.

The external electrodes 210 and 220 may be disposed on the body 100, and may be connected to the internal electrode layers 121 and 122. As illustrated in FIGS. 1 and 2, the external electrodes 210 and 220 may include first and second external electrodes 210 and 220, respectively disposed on the third and fourth surfaces 103 and 104 of the body 100 to be connected to the first and second internal electrode layers 121 and 122.

The first and second external electrodes 210 and 220 may include first and second connection portions, respectively disposed on the third and fourth surfaces 103 and 104 of the body 100 to be connected to the first and second internal electrode layers 121 and 122, and first and second extension portions extending from the first and second connection portions to the first surface 101 of the body 100. The first and second extension portions may be disposed to be spaced apart from each other on the first surface 101 of the body 100. The first and second extension portions may extend not only to the first surface 101 of the body 100, but also to each of the second, fifth, and sixth surfaces 102, 105 and 106 of the body 100. However, the scope of the present disclosure is not limited thereto. For example, as illustrated in FIG. 1, each of the external electrodes 210 and 220 of the present disclosure may be a normal-type electrode formed on five surfaces of the body 100, but exemplary embodiments are not limited thereto. Each of the external electrodes 210 and 220 may be an L-type electrode formed on two surfaces of the body 100, a C-type electrode formed on three surfaces of the body 100, or the like.

The external electrodes 210 and 220 may be formed of any material such as a metal, or the like, as long as it has electrical conductivity. A specific material of the external electrodes 210 and 220 may be determined in consideration of electrical characteristics, structural stability, and the like. Further, the external electrodes 210 and 220 may have a multilayer structure. For example, each of the external electrodes 210 and 220 may include a first layer and a second layer. The first layer may be formed by sintering a sintered conductive paste including a conductive metal and a glass, by curing a curable conductive paste including a conductive metal and a base resin, or by vapor deposition. The second layer may include a nickel (Ni) plating layer and a tin (Sn) plating layer sequentially formed on the first layer by a plating method.

In the present embodiment, a structure in which the capacitor component 100 includes two external electrodes 210 and 220 has been described, but the number or shape of the external electrodes 210 and 220 may vary depending on a form or other purposes of the internal electrodes 121 and 122.

Method for Manufacturing Capacitor Component

Figure 6:
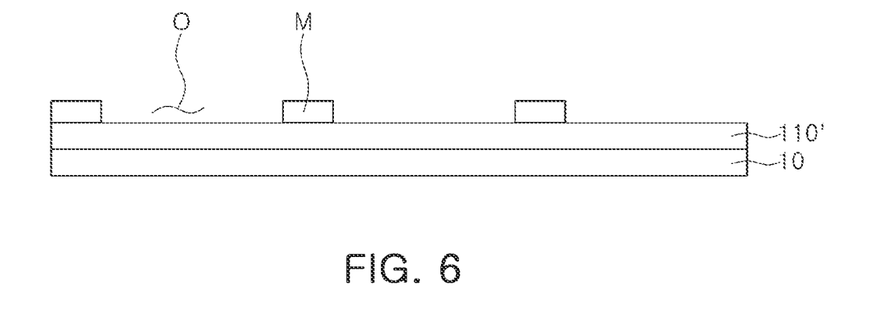
FIGS. 6 to 13 are flow diagrams illustrating a method of manufacturing a capacitor component according to an exemplary embodiment of the present disclosure.
Figure 7:
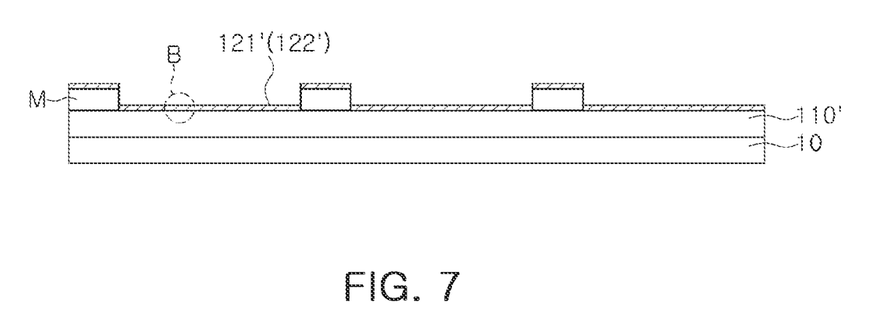
Figure 8:
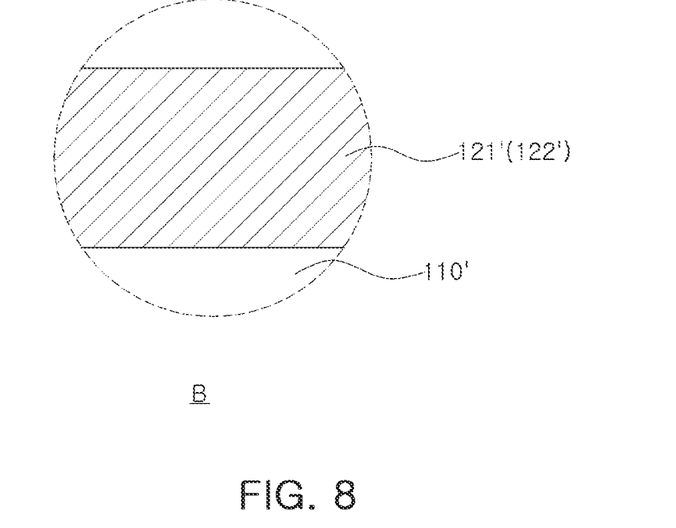
Figure 9:
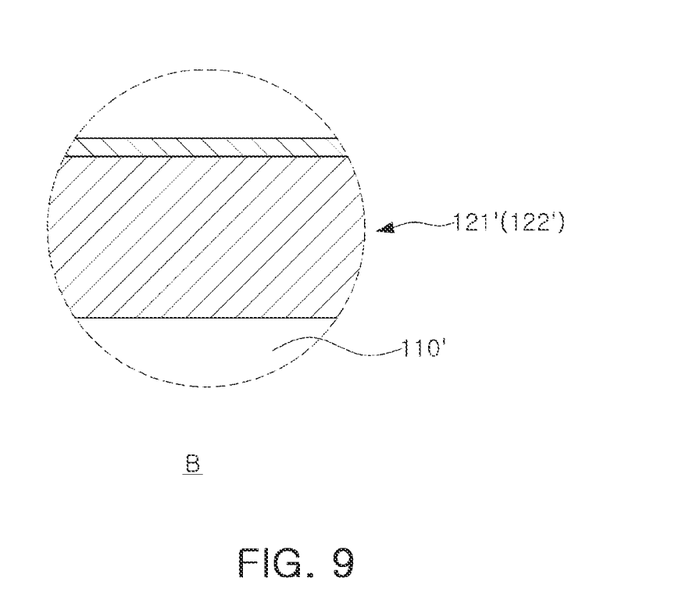
Figure 10:
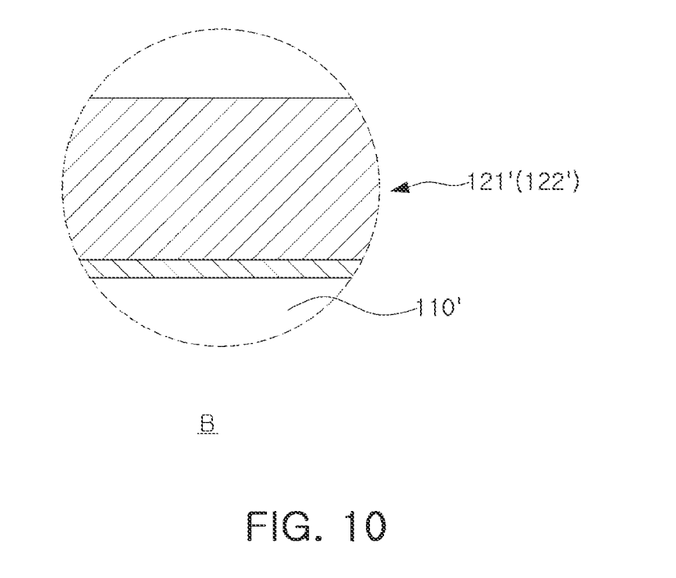

FIGS. 6 to 13 are flow diagrams illustrating a method of manufacturing a capacitor component according to an exemplary embodiment. Specifically, FIGS. 6, 7, and 11 to 13 illustrate a method of manufacturing a capacitor component according to an exemplary embodiment, and FIGS. 8 to 10 illustrate various examples of a structure of a conductive thin film, respectively.

Referring to FIG. 6, a dielectric green sheet 100' may be formed on a support plate 10.

The support plate 10 may be a PET film, or the like, and may support the dielectric green sheet 110' during a process.

The dielectric green sheet 110' may be an element which becomes the dielectric layer 110 through a subsequent process, and may be formed by applying a dielectric paste to the support plate 10. The dielectric paste may be a paste in which various ceramic additives, organic solvents, plasticizers, binders, dispersants, and the like, are added to ceramic powder particles such as barium titanate ($BaTiO_3$), a dielectric material, according to the purpose of the present disclosure.

Referring to FIG. 7, a mask M may be provided on one surface of the dielectric green sheet 110', and a conductive thin film may be formed on the dielectric green sheet 110'.

The mask M may have an opening O corresponding to a region, in which conductive thin films 121' and 122' to be described later are formed, of one surface of the dielectric green sheet 110'. The mask M may be a mask or a stencil used for conventional vapor deposition. In FIG. 7, the mask M is illustrated as being in contact with one surface of the dielectric green sheet 100'. However, this is only an example and the case, in which the mask M is spaced apart from the one surface of the dielectric green sheet 100' by a predetermined distance, is within coverage of the present disclosure.

The conductive thin films 121' and 122' may be elements which become the internal electrode layers 121 and 122 through a subsequent process, and may be formed in a region, exposed to the opening O of the mask, of one surface of the dielectric green sheet 110' by vapor deposition such as sputtering, chemical vapor deposition (CVD), or atomic layer deposition (ALD). The conductive thin films 121' and 122' may be formed by simultaneously or sequentially depositing a first conductive material for forming a base portion "B" and a second conductive material for forming a connection portion "I" in the region, exposed to the opening O of the mask M, of the one surface of the dielectric green sheet 100'. For example, the first conductive material may be nickel (Ni) and the second conductive material may be indium-tin oxide (ITO).

In the indium-tin oxide (ITO), a molar ratio of indium (In) to tin (Sn) may be 1 or more to 19 or less. For example, the indium-tin oxide (ITO) used to form the connection portion "I" may include 50 to 95 mol % of indium (In)—5 to 50 mol % of tin (Sn). When the molar ratio of indium (In) to tin (Sn) in indium-tin oxide (ITO) is less than 1, conductive characteristics of the connection portion "I" may be deteriorated, resulting in poor component characteristics. When the molar ratio of indium (In) to tin (Sn) in indium-tin oxide (ITO) is greater than 19, component manufacturing costs may be increased.

In the conductive thin films 121' and 122', a volume ratio (vol %) of the second conductive material to the first conductive material may be 1 or more to 30 or less. When the ratio is less than 1, a ratio of the connection portion "I" formed in the internal electrode layers 121 and 122 is low, and thus, the effect of improving connectivity and thickness uniformity of the internal electrode layers 121 and 122 may be reduced. When the ratio is greater than 30, an interface between the base portion "B" and the connection portion "I" may be increased more than necessary to deteriorate component characteristics.

A thickness of the conductive thin films 121' and 122' may be 10 nm or more to 500 nm or less. When the thickness of the conductive thin films 121' and 122' is less than 10 nm, the connectivity of the internal electrode layers 121 and 122 may be deteriorated to reduce capacitance. When the thickness of the conductive thin films 121' and 122' is greater than 500 nm, it may be difficult to achieve electrical insulation between the internal electrode layers 121 and 122 because the dielectric layer 110 is formed to be thin based on a component having the same size. In the present embodiment, the conductive thin films 121' and 122' are formed by vapor deposition and then sintered to form the internal electrode layers 121 and 122. Therefore, due to a dense structure of the conductive thin films 121' and 122', a thickness of the conductive thin films 121' and 122' before being sintered and a thickness of the conductive thin film 121' and 122' after being sintered may be maintained at substantially the same level.

FIGS. 8 to 10 illustrate various shapes of the conductive thin films 121' and 122'. Referring to FIG. 8, the conductive thin films 121' and 122' may be formed by simultaneously depositing a first conductive material and a second conductive material in the same deposition process. For example, nickel (Ni) and indium-tin oxide (ITO) may be simultaneously deposited on one surface of the dielectric green sheet 110' to form the conductive thin films 121' and 122' illustrated in FIG. 8. Referring to FIGS. 9 and 10, the conductive thin films 121' and 122' may have a double-layer structure in which a first conductive material is deposited to be formed, and a second conductive material is then deposited (see FIG. 9), and may have a double-layer structure in which a first conductive material is deposited to be formed, and a first conductive material is then deposited (see FIG. 10).

Figure 11:
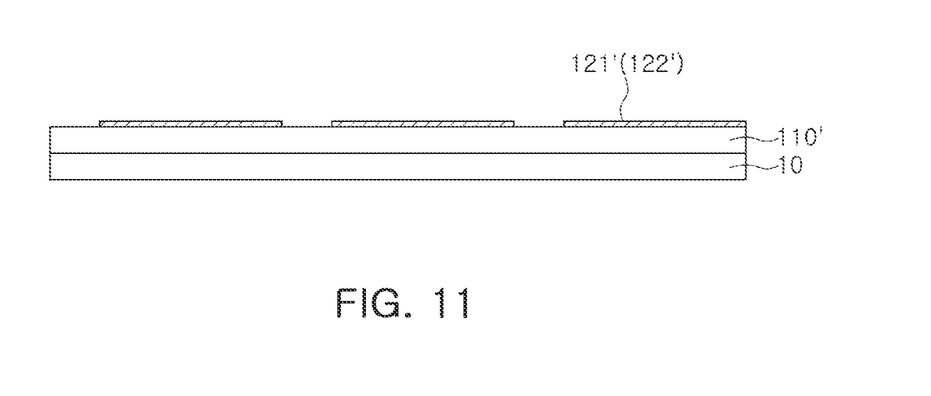

Referring to FIG. 11, a mask may be removed from one surface of the dielectric green sheet.

As an example, a release layer may be formed on one surface of the mask M in contact with one surface of the dielectric green sheet 110', and the mask M may be removed using the release layer. As another example, the mask M may be removed using a stripper, or the like.

Figure 12:
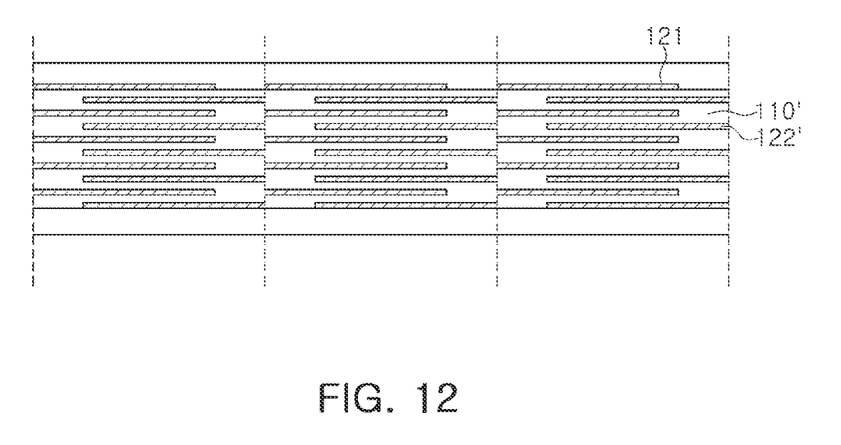

Referring to FIG. 12, a plurality of dielectric green sheets including a conductive thin film, formed on one surface thereof, may be prepared and then laminated to form a multilayer body, and the multilayer body may be diced to form green chips.

The plurality of dielectric green sheets may be prepared according to the processes described with reference to FIGS. 6, 7, and 11. Support plates 10 may be separated from the plurality of dielectric green sheets, and may be then laminated.

The multilayer body may be diced to be divided into a plurality of green chips, each corresponding to a body of an individual capacitor component.

Figure 13:
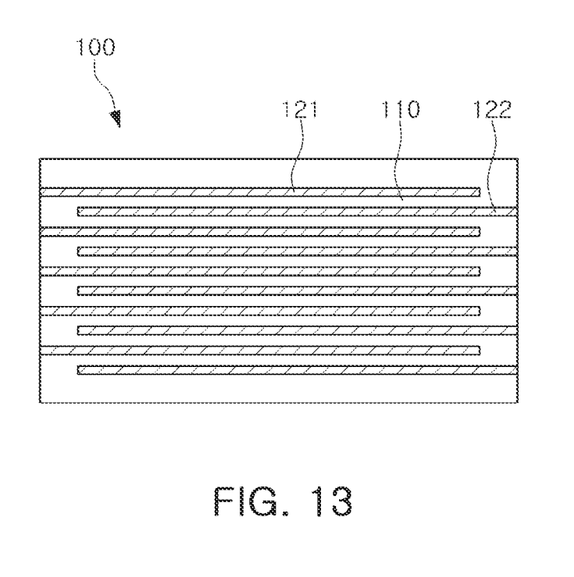

Referring to FIG. 13, the green chip may be sintered to form a body.

Although not illustrated, a process of forming an external electrode may be performed after the body 100 is formed, and a process of forming a moisture barrier layer on a surface of the body 100 may be performed, as necessary.

As described above, a capacitor component according to an aspect of the present disclosure may improve connectivity of an internal electrode layer.

A capacitor component according to another aspect of the present disclosure may improve uniformity of an internal electrode layer.

A capacitor component according to another aspect of the present disclosure may reduce a thickness of an internal electrode layer.

While exemplary embodiments have been shown and described above, it will be apparent to those skilled in the art that modifications and variations could be made without departing from the scope of the present disclosure as defined by the appended claims.

What is claimed is:

1. A capacitor component comprising:
a body including a dielectric layer and an internal electrode layer, a plurality of holes spaced apart from each other and disposed in the internal electrode layer, wherein a region including at least one selected from the group consisting of indium (In) and tin (Sn) is disposed in at least one of the plurality of holes; and
an external electrode disposed on the body and connected to the internal electrode layer.

2. The capacitor component of claim 1, wherein the internal electrode layer includes nickel (Ni).

3. The capacitor component of claim 2, wherein the region includes both indium (In) and tin (Sn).

4. The capacitor component of claim 3, wherein in the region, a molar ratio of indium (In) to tin (Sn) is 1 or more to 19 or less.

5. The capacitor component of claim 2, wherein
the plurality of holes includes a first hole, in which the region is disposed, and a second hole in which the region is not disposed.

6. The capacitor component of claim 5, wherein in a cross-section of the body in a first direction, a ratio of a length of the second hole in a second direction to a total length of the internal electrode layer in the second direction, perpendicular to the first direction, is 0.2 or less.

7. The capacitor component of claim 5, wherein a ratio (vol %) of a volume of the region to a volume of the internal electrode layer is 1 or more to 30 or less.

8. The capacitor component of claim 2, wherein the internal electrode layer has a thickness of 10 nm or more to 500 nm or less.

9. The capacitor component of claim 8, wherein a ratio of a difference between thicknesses of adjacent internal electrodes to a thickness of one of the adjacent internal electrodes is 5% or less.

10. The capacitor component of claim 2, wherein the region does not include a dielectric material of the dielectric layer.

11. A method of manufacturing the capacitor component of claim 1, the method comprising:
forming a dielectric green sheet;
forming a conductive thin film, including a first conductive material and a second conductive material, on the dielectric green sheet by vapor deposition; and
sintering the conductive thin film to form the internal electrode layer,
wherein the internal electrode layer includes the first conductive material, and
a region, including the second conductive material, is formed in the internal electrode layer.

12. The method of claim 11, wherein the first conductive material is nickel (Ni), and
the second conductive material is indium-tin oxide (ITO).

13. The method of claim 12, wherein in the forming of the conductive thin film, a ratio (vol %) of a volume of the second conductive material to a volume of the first conductive material is 1 or more to 30 or less.

14. The method of claim 12, wherein in the forming of the conductive thin film, the first and second conductive materials are deposited together with the dielectric green sheet.

15. The method of claim 12, wherein in the forming of the conductive thin film, the first and second conductive materials are sequentially formed on the dielectric green sheet.

16. The method of claim 11, wherein in the forming of the conductive thin film, an average thickness of the conductive thin film is 10 nm or more to 500 nm or less.

17. A capacitor component comprising:
a body including a dielectric layer and an internal electrode layer; and
an external electrode disposed on the body and connected to the internal electrode layer,
wherein a plurality of holes are formed in the internal electrode layer, and each of the plurality of holes penetrates through the internal electrode layer,
a region, including a conductive material different from that of the internal electrode layer, is disposed in at least some of the plurality of holes, and
the region includes indium-tin oxide (ITO).

18. The capacitor component of claim 17, wherein the internal electrode layer includes nickel (Ni).

19. The capacitor component of claim 18, wherein the plurality of holes include a first hole, in which the region is disposed, and a second hole in which the region is not disposed, and
in a cross-section of the body in a first direction, a ratio of a length of the second hole in a second direction to a total length of the internal electrode layer in the second direction,
perpendicular to the first direction, is 0.2 or less.

20. The capacitor component of claim 17, wherein the region does not include a dielectric material of the dielectric layer.

21. A capacitor component comprising:
a body including a dielectric layer and an internal electrode layer,
wherein the internal electrode layer includes a plurality of holes spaced apart from each other, and
a region including indium-tin oxide (ITO) is disposed in at least one of the plurality of holes.

22. The capacitor component of claim 21, wherein each of the plurality of holes penetrates through the internal electrode layer.

23. The capacitor component of claim 21, wherein the internal electrode layer includes nickel (Ni).

24. The capacitor component of claim 21, wherein the plurality of holes include a first hole, in which the region is disposed, and a second hole in which the region is not disposed, and
in a cross-section of the body in a first direction, a ratio of a length of the second hole in a second direction to a total length of the internal electrode layer in the second direction, perpendicular to the first direction, is 0.2 or less.

25. The capacitor component of claim 21, wherein in the region, a molar ratio of indium (In) to tin (Sn) is 1 or more to 19 or less.

26. The capacitor component of claim 21, wherein the internal electrode layer includes adjacent internal electrodes, and a ratio of a difference between thicknesses of the adjacent internal electrodes to a thickness of one of the adjacent internal electrodes is 5% or less.

27. The capacitor component of claim 21, wherein the region includes both indium (In) and tin (Sn).

28. The capacitor component of claim 27, wherein in the region, a molar ratio of indium (In) to tin (Sn) is 1 or more to 19 or less.

29. A capacitor component comprising:
- a body including a dielectric layer and an internal electrode layer,
- wherein the internal electrode layer includes a plurality of holes spaced apart from each other,
- a region including at least one selected from the group consisting of indium (In) and tin (Sn) is disposed in at least one of the plurality of holes, and
- a ratio of a volume of the region to a volume of the internal electrode layer is 1 or more to 30 or less.

30. The capacitor component of claim 29, wherein the internal electrode layer includes nickel (Ni).

31. The capacitor component of claim 29, wherein the plurality of holes include a first hole, in which the region is disposed, and a second hole in which the region is not disposed, and
- in a cross-section of the body in a first direction, a ratio of a length of the second hole in a second direction to a total length of the internal electrode layer in the second direction, perpendicular to the first direction, is 0.2 or less.

32. The capacitor component of claim 29, wherein the internal electrode layer includes adjacent internal electrodes, and a ratio of a difference between thicknesses of the adjacent internal electrodes to a thickness of one of the adjacent internal electrodes is 5% or less.

\* \* \* \* \*